J. I. HOWARD.
JOINT FOR FLOOR COVERINGS.
APPLICATION FILED AUG. 17, 1908.
924,355.
Patented June 8, 1909.
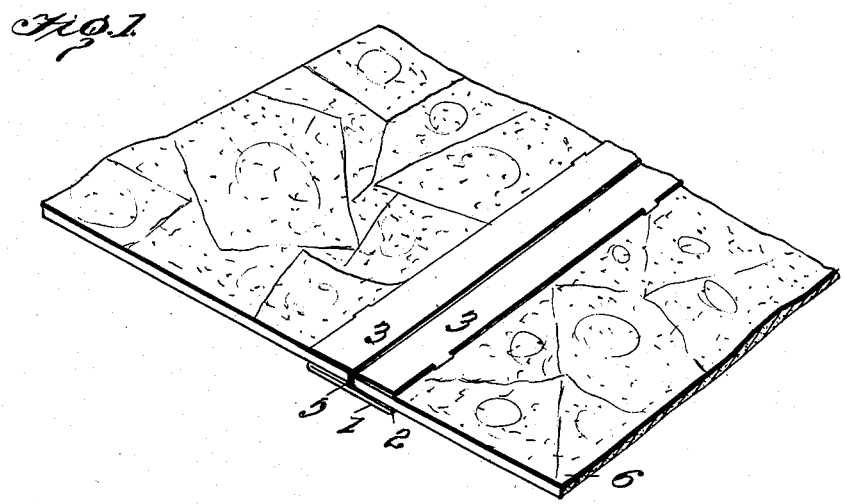
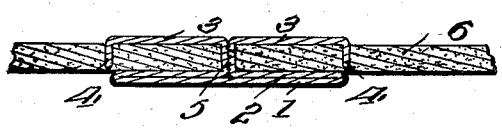
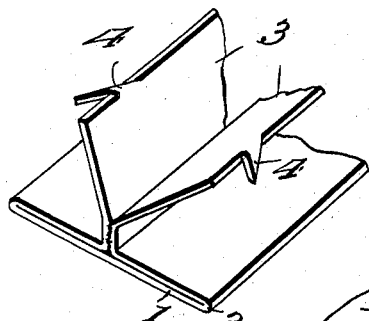
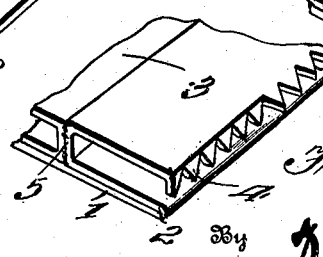
Witnesses
Inventor
J. I. Howard.
By
Attorneys

UNITED STATES PATENT OFFICE.

JAMES I. HOWARD, OF AMETHYST, COLORADO, ASSIGNOR OF ONE-THIRD TO SILAS FRANK AND ONE-THIRD TO ALPHA D. PARSONS, OF AMETHYST, COLORADO.

JOINT FOR FLOOR-COVERINGS.

No. 924,355.  Specification of Letters Patent.  Patented June 8, 1909.

Application filed August 17, 1908. Serial No. 448,883.

*To all whom it may concern:*

Be it known that I, JAMES I. HOWARD, a citizen of the United States, residing at Amethyst, in the county of Mineral and State of Colorado, have invented certain new and useful Improvements in Joints for Floor-Coverings, of which the following is a specification.

The object of my invention is to provide a simple, efficient and durable device whereby any material composed of strips or sections may be joined and securely held together at its edges, and is more particularly designed for use in connection with floor coverings.

A further object of my invention is to increase the life of certain character of floor coverings by incasing and protecting the edges and joints from the decaying action of water, and also eliminating the condition wherein they become easily broken when slightly curled or partially turned upward. The clamp or joint hereinafter referred to as the "clip" is preferably constructed in one piece, and of any desired material possessing the necessary flexibility to be turned or bent to assume the proper construction and shape in connection with the articles to be secured and held together.

For a full understanding of the invention, reference is to be had to the following description and accompanying drawings, in which:—

Figure 1 is a perspective view of the clip engaging the edge of two pieces of material. Fig. 2 a transverse sectional view of the clip taken through one of the pointed projections; Fig. 3 a view corresponding to Fig. 2 taken intermediate of the pointed projections; Fig. 4 a perspective view of the clip showing the clamp members in an open extended position. Fig. 5 a modification of the clip adapted for use as a binding for one edge, and, Fig. 6 a modification of the clip showing continuous pointed projections formed at the edge thereof.

Corresponding and like parts are referred to in the following description and indicated in all the views of the drawings by the same reference characters.

Referring to the drawings, the numeral 1 designates a plate or base of the clip made of any suitable material, and turned back toward its center at both ends as shown at 2, to acquire the proper structural formation.

The numeral 3 designates oppositely disposed clamp members integrally a part of the plate 1 and provided with toothed or serrated edges 4. The abutting ends of the clamp members 3 are preferably soldered or otherwise secured together as shown at 5, to obtain sufficient rigidity at that point to enable said clamp members to be easily bent and the teeth 4 to engage the material 6 without destroying the uniformity of the clip when forcing the clamp members downwardly into a clamping position.

For the purpose of binding and protecting the outer edges of the material I utilize a single clip constituting a half of the clip above specified, the operation being the same. See Fig. 5. With the arrangement shown the clip is made preferably in a continuous strip and of one piece of metal turned and bent to assume the formation shown in Fig. 4, and when in this position, the edges of the material 6 are placed flat upon the plate 1 on both sides thereof, preparatory to the clamp members 3 being bent downwardly and the teeth 4 driven into the material as shown in Fig. 1. Inasmuch as the material is not secured permanently or in any wise fastened directly to the floor at any point, warping and ridging is entirely eliminated in that the effect of atmospheric changes is distributed over the entire surface of the floor covering and concentrated at the border or outer edge of the material. A continuous serpentine edge cut on the metal along the edges of the clamp members 3 and bent at right angles to said clips may be substituted for the teeth 4 and considered within the scope of the invention. See Fig. 6. It will be noted that the clip may be used in joining and binding the edges of any material designed to form a covering of any character, and in certain materials such as mattings wherein the edges are more exposed to wear than the other portion of its surface, the clip may be advantageously employed. For commercial reasons the exposed face of the clamp member may be suitably decorated, and the clip composed of material the quality of which will more suitably meet the requirement for which it is intended.

Having thus described the invention, what is claimed as new is:—

1. A clip comprising a base plate turned back upon itself to reinforce the base and provided with a clamp member, and penetrating projections formed upon the edge of said clamp member.

2. A clip comprising a base plate formed with oppositely disposed clamp members, the abutting ends of which are secured together to form a back-bone or support.

3. A clip comprising a base plate turned back upon its inner face at both edges to reinforce the base and form oppositely disposed clamp members, said members being adapted to engage the articles to be joined, substantially as described.

4. A clip comprising a base plate formed with oppositely disposed clamp members, the abutting ends of which are secured together to form a backbone or support, and projections formed at the edges of said clamp members and adapted to engage the articles to be joined, substantially as described.

In testimony whereof I affix my signature in presence of two witnesses.

JAMES I. HOWARD. [L. S.]

Witnesses:
G. W. LINDSLEY,
F. A. STENGER.